(12) United States Patent
Boric

(10) Patent No.: US 6,615,586 B1
(45) Date of Patent: Sep. 9, 2003

(54) HIGH-PRESSURE GAS-TURBINE PLANT USING HIGH-PRESSURE PISTON-TYPE COMPRESSOR

(75) Inventor: Miroslav Boric, Split (HR)

(73) Assignee: Mirela Shipley, Winter Park, FL (US)

( * ) Notice: Subject to any disclaimer, the term of this patent is extended or adjusted under 35 U.S.C. 154(b) by 0 days.

(21) Appl. No.: 10/030,034

(22) PCT Filed: Jul. 7, 1999

(86) PCT No.: PCT/HR99/00013
§ 371 (c)(1),
(2), (4) Date: Jan. 3, 2002

(87) PCT Pub. No.: WO01/04477
PCT Pub. Date: Jan. 18, 2001

(51) Int. Cl.[7] ............................................... F02C 3/055
(52) U.S. Cl. ........................................................ 60/729
(58) Field of Search ........................... 60/729; 417/364, 417/405, 408

(56) References Cited

U.S. PATENT DOCUMENTS

| | | | | |
|---|---|---|---|---|
| 2,590,457 A | * | 3/1952 | Pouit | 416/20 R |
| 4,336,686 A | * | 6/1982 | Porter | 60/39.63 |
| 4,578,955 A | * | 4/1986 | Medina | 60/709 |
| 4,873,822 A | * | 10/1989 | Benaroya | 60/805 |

* cited by examiner

Primary Examiner—Ehud Gartenberg
(74) Attorney, Agent, or Firm—Kathleen T. Petrich

(57) ABSTRACT

A power plant especially for the propulsion of waterborne vehicles, includes two prime movers, a gas turbine (1) and a diesel starting engine (3) for selectively driving, via a central gearbox (4) and clutches (7) and (9), a power output shaft (5) and a generator (6). The gas turbine (1) is driven by a piston-like compressor (2) via central gearbox (4) and clutches (7) and (8), and further includes a turbocharger (12) and an intercooler (13) connected between the outlet of turbine (1) and the inlet of compressor (2). The diesel engine (3) drives auxiliary electric generator (17). The power output shaft drives a propeller (19) through a bearing (11). The shaft generator (6) is stabilized by a flywheel (22).

17 Claims, 1 Drawing Sheet

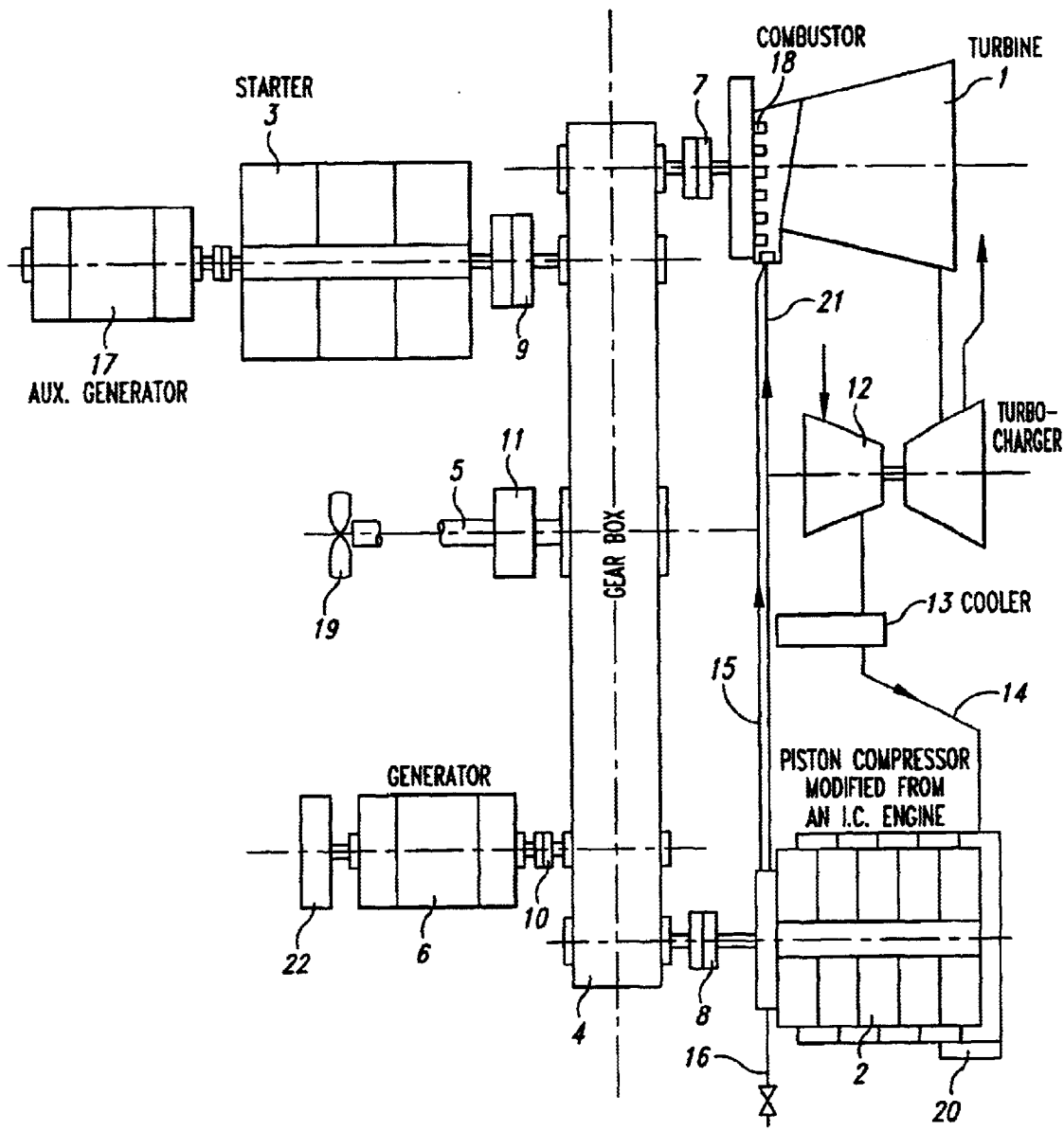

HIGH-PRESSURE GAS-TURBINE PLANT USING HIGH-PRESSURE PISTON-TYPE COMPRESSOR

DESCRIPTION OF THE INVENTION

Technical Description

Subject matter of the invention relates to high-pressure gas-turbine plant for powering of ships.

The invention belongs to the International Patent Classification class F 02 C, comprising gas-turbine plants.

Technical Problem

Because of its low degree of efficiency, classical gas turbine has never got widely applied, except with navy and emergency plants where economy is not a priority. The problem is about the gas turbines working with high air flow speeds and relatively low combustion pressures, being therefore no competition to diesel powered engines.

Situation in Technology

Gas turbines are subjected to high thermal and mechanical load. They are mostly applied in aeronautics, on navy and to a lesser degree on trains and road vehicles. The relevant situation in technology are the following patent documents: U.S. Pat. No. 4,369,630, presenting a classic gas-turbine plant combined with a diesel engine, but completely differently built, operating with low pressures; and DE-A-38 37 736 presenting a plant with rotating compressor with small compressions, and used for generating power in emergencies.

Due to low efficiency degree, with large plants, heat recuperation systems in steam turbine plant has been introduced.

Essence of the Invention

The essence of the invention is about increasing the efficiency of the gas-turbine plant by replacing the turbo-compressor at the high-pressure gas turbine shaft with a high-pressure -piston-type air compressor, which enables expansion of the combustion mixture of high adiabatic fall.

Every four-stroke diesel engine can be turned into a high-pressure piston-type air compressor at a low cost and, theoretically, double the air intake for powering the high-pressure gas turbine.

High-pressure gas turbine that, according to this invention, has a piston-type compressor instead of a turbo-compressor on its rotor shaft, is particularly favourable for production of high powers in a single block, and is of:
higher efficiency degree,
high adiabatic fall,
lesser air/combustion-gases flow speeds and, therefore, lesser friction resistance,
lesser rotation speeds,
lesser plant weights,
significantly lesser noise.

FIGURE DESCRIPTION

FIG. 1. shows block-diagram of a high-pressure piston-type gas-turbine plant connected indirectly, through reduction gears, to the gas-turbine rotor.

The block-diagram shows the structure and operating principle of a plant designed for fitting on board of ships.

DETAILED DESCRIPTION OF A POSSIBLE INVENTION EMBODIMENT

As shown, the high-pressure gas-turbine plant comprises:
high-pressure gas turbine 1 of reinforced sides due to high pressures, thermally and mechanically lesser loaded, supplied on its rotor with a high-pressure piston-type compressor 2, connected directly or indirectly through the gear-box 4, and with as many combustion chambers 18 as there are cylinders in the high-pressure piston-type compressor; each combustion chamber supplied with a fuel valve with combustion stimulators (EPO patent EP593793B1 and HP patent P920497) and one high-pressure pipe 15 connection from every high-pressure compressor 2 cylinder, of better efficiency degree and better useful power; combustion chambers being thermally lesser loaded;
high-pressure piston-type air compressor 2, of high-pressure compression, multi-cylinder, supercharged, single-stage, single-acting, "V", or other compact design, high-speed or medium-speed engine; whereby every four-stroke diesel engine can be turned into a high-pressure piston-type compressor of the following characteristics:
equipped with camshaft powered by crankshaft by means of a gear-box of the rotation speed ratio 1:1;
equipped with intake and output pressure valves in baskets located in the cylinder covers; valve opening and closing being controlled by valve camshaft, like with engines, according to a given cam timing;
equipped with high-pressure fuel pump, cams for operating pump pistons with mechanism for control of intake and of fuel pre-injection angle into the combustion chamber 18 of the high-pressure turbine 1, connected to the control levers;
equipped with control stand 20 from where the entire plant is controlled,
equipped with safety equipment and WOOD-WOORD® or other rotation speed regulator,
equipped with safety valves located in the cylinder covers,
possibly equipped with compressor-starting decompressors;
turbocharger 12, whose low-pressure turbo-compressor takes air from the atmosphere, compresses it to higher pressure, takes it through the air cooler 13 and pressures it to the high-pressure piston-type compressor 2;
low-pressure compression air cooler 13, connected with pipes 14 to the turbocharger 12 and the high-pressure piston-type compressor 2;
high-pressure air pipes 15, connecting each high-pressure piston-type compressor 2 valve with the corresponding combustion chamber 18 at the high-pressure gas-turbine 1 front side;
high-pressure fuel pipes 21, taking fuel from the high-pressure fuel pump, located on the high-pressure compressor 2, to the fuel valves located in the combustion chambers 18 in the high-pressure turbine 1;
connection 16 for ship service air;
gear-box 4, consisting of the following gears gear for taking power from the high-pressure gas turbine 1, gear for taking power from the diesel engine 3, gear for powering the high-pressure piston-type compressor 2, gear-for powering the shaft generator 6, and the central propulsion or generator gear 19;

engine 3 for starting of the plant from resting; it can be electric, hydraulic, pneumatic or diesel powered; which engine has generator 17 at one end and the shaft coupling clutch 9 at the other; whereby more powerful engine act as spare propulsion drive in emergency; power output shaft 5, connected to the central gear 4, and through the thrust bearing 11 to the propulsion propeller 19 or the generator;

shaft, generator 6, with the kinetic shaft clutch 10 connected to the gear-box 4 at one end, and the electricity-frequency stabilising flywheel 22 at the other; whereby in stead of the generator there can be fitted another high-pressure piston-type compressor 2 for doubling the turbine plant power;

shaft coupling clutches 7, 8 and 9, which can be hydraulic, electromagnetic or pneumatic designed, and serve for coupling the high-pressure gas turbine 1, the high-pressure piston-type compressor 2, the engine 3 to and off the gear-box 4;

kinetic shaft clutch 10, which can be pneumatic (patent application HP P921016A) or electromagnetic (patent application HP P931533A);

thrust bearing 11 fitted between the gear-box 4 and the shaft 5 and the propulsion propeller 19;

auxiliary, generator 17 for generating electricity for the ship and plant requirements;

propulsion propeller 19 with movable blades.

The high-pressure gas turbine, according to this invention and the block diagram presented in FIG. 1, functions in the following way:

INITIAL STARTING

The plant is initially started from resting by means of the diesel engine 3. The generator 17 is to be switched off the network while the plant is being started. After starting of the diesel engine 3, the shaft-coupling clutches 7, 8 and 9 are connected, and the shaft clutch 10 is disconnected. By means of the gear-box 4, the high-pressure gas turbine 1, the high-pressure piston-type compressor 2, the propeller shaft 5 and the propulsion propeller 19 are started simultaneously. Rotation of the high-pressure piston-type compressor 2 pumps air from the atmosphere through the turbocharger 12 turbo-compressor, the air cooler 13 and pipes 14 into the high-pressure compressor 2 where it is being compressed and taken by high-pressure pipes 15 to the high-pressure gas turbine 1 combustion chambers 18, where it expands and drives the high-pressure turbine rotor. After exiting the turbine 1, the air drives the turbocharger 12 gas turbine, that starts low-pressure compression of the atmosphere air in the turbo-compressor. This idle rotation can last a longer period of time.

PERMANENT RUNNING

By moving the fuel handle and the high-pressure fuel pump levers located at the high-pressure compressor 2 into the position RUNNING, high-pressure fuel is driven through the high-pressure fuel pipes 21 into the fuel valves located in the combustion chambers 18 in the high-pressure gas turbine 1.

Combustion gases produced by the fuel combustion expand in the high-pressure gas turbine 1. Here commences transformation of the fuel energy into mechanical work and rotation of the high-pressure gas turbine 1. When leaving the high-pressure gas turbine 1, the combustion gases enter the turbocharger 12 gas turbine, where expansion and driving of the turbocharger turbine is continued. After this, the combustion gases go into economiser and the atmosphere.

Energy of the gases leaving the high-pressure turbine 1 drive the turbocharger 12 which takes air from the atmosphere, compresses it to a higher pressure, drives it through the air cooler 13 and the pipes 14 to the high-pressure piston-type compressor 2 cylinder inlet valves, where the air is compressed to high pressure and, through valves, taken by the pipes 15 into the combustion chambers 18 of the high-pressure gas turbine 1. In the combustion chamber, the fuel is ignited aided by the combustion stimulator that is intended to increase the plant efficiency degree. After the initial start, the diesel engine 3 is disconnected from the gear box 4, when the generator 17 can be connected to the network.

Permanent running is continued by the high-pressure gas turbine 1, by the produced power and by means of the gear box 4, drives independently the piston-type compressor 2, the shaft 5 with the propeller 19 or the power-plant generator. Rotation and production of power in the high-pressure gas turbine is modified by changing of charging of the high-pressure fuel pumps located at the high-pressure compressor 2. The entire plant is controlled manually or automatically from the control stand 20. Power and rotation stabilisation of the propeller 19 is obtained by known rotation and power regulators such as WOODWOORD® or others.

Low-cost electricity can be used while the ship is under way by starting the shaft generator 6 by means of the kinetic shaft clutch 10. The generators, at the other end of the rotor shaft, is equipped with the flywheel 22 that stabilises the produced electricity frequency in conditions of storm, pitching, etc.

The engine 3 and the generator 17 produce electricity when the ship is in port or under way with the shaft coupling clutch 9 disconnected. The engine 3 can be used as an emergency auxiliary propulsion. In such case, the shaft coupling clutches 7, 8 and 10 are disconnected, and the clutch 9 is connected. The generator 17 is switched off the network.

INVENTION EMPLOYMENT

High-pressure gas turbines, equipped with high-pressure piston-type compressor on the rotor shaft will have a wide employment for their increasing the efficiency degree.

Thanks to their small weight, decreased noise and simplicity, they can be fitted into:

passenger cars, sports cars, all other road-going vehicles, stabile and mobile power-supply plants, nautics, for obtaining from the smallest to the highest powers in a single block, on board civil and navy alike, rail traffic, from cargo to super-fast trains, air traffic, in large capacity aeroplanes.

What is claimed is:

1. A gas turbine power plant, comprising:

a gas turbine including a plurality of combustion chambers;

a piston-type air compressor mechanically connected to the gas turbine and driven by it; and a plurality of pipes connected between the air compressor and the combustion chambers, the air compressor supplying compressed air to the combustion chambers of the gas turbine through the pipes.

2. The gas turbine power plant of claim 1, further comprising a fuel pump connected to the compressor and a plurality fuel pipes connected between the fuel pump and the combustion chambers on the gas turbine, the fuel lines supplying fuel from the fuel pump to the combustion chambers.

3. The gas turbine power plant of claim 1, further comprising a turbocharger driven by exhaust gases from the gas turbine and connected to the piston-type compressor such that the turbocharger takes air from the atmosphere, compresses it, and provides the compressed air to the piston-type compressor.

4. The gas turbine power plant of claim 3, further comprising an air cooler disposed between the turbocharger and the piston type compressor such that compressed air from the turbocharger is cooled before entering the piston-type compressor.

5. The gas turbine power plant of claim 1, wherein the piston-type air compressor has a plurality of cylinders, each cylinder having a piston moving therein and an outlet, the number of cylinders equaling the number of combustion chambers, and wherein the plurality of pipes includes a pipe connected between each cylinder outlet and each combustion chamber.

6. The gas turbine power plant of claim 5, wherein the piston-type air compressor is made from a diesel engine modified to operate as an air compressor.

7. The gas turbine power plant of claim 1, wherein the piston-type air compressor is mechanically connected to the gas turbine through a gearbox.

8. The gas turbine power plant of claim 7, wherein the gas turbine and the compressor are each connected to the gearbox through a selectively engageable and disengageable shaft-coupling clutch.

9. The gas turbine power plant of claim 7, further comprising a generator 6 connected to the gearbox through a kinetic clutch at one end, and having an electricity frequency stabilizing flywheel at its other end.

10. The gas turbine power plant of claim 7, further comprising a second piston type compressor connected to the gearbox, the second piston type compressor also supplying compressed air to the gas turbine to further increase power produced by the gas turbine.

11. The gas turbine power plant of claim 7, further comprising an output shaft connected to the gearbox such that the output shaft is driven by the gas generator.

12. The gas turbine power plant of claim 11, wherein the output shaft drives a propeller for a marine vessel.

13. The gas turbine power plant of claim 7, further comprising an engine for starting the gas turbine power plant, the engine being connected to the gearbox through a selectively engageable and disengageable shaft-coupling clutch.

14. The gas turbine power plant of claim 13, wherein the engine for starting is a diesel engine.

15. The gas turbine power plant of claim 14, further comprising an auxiliary generator connected to the diesel engine.

16. A gas turbine power plant, comprising:
   a gas turbine including a plurality of combustion chambers;
   a piston-type air compressor mechanically connected to the gas turbine and driven by it through a gearbox, the gas turbine and compressor each connected to the gearbox through a selectively engageable and disengageable shaft-coupling clutch;
   an output shaft connected to the gearbox such that the output shaft is driven by the gas generator;
   an engine for starting the gas turbine power plant, the engine being connected to the gearbox through a selectively engageable and disengageable shaft-coupling clutch; and
   a plurality of pipes connected between the air compressor and the combustion chambers, the air compressor supplying compressed air to the combustion chambers of the gas turbine through the pipes.

17. In a gas turbine power plant having a source of compressed air and a source of fuel, the compressed air and fuel being combined in a plurality of combustion chambers and combusting therein to produce combustion gases that drive a gas turbine, the improvement comprising: using a piston-type air compressor as the source of compressed air rather than a turbo-compressor, the piston-type air compressor being mechanically connected to the gas turbine and driven by it.

* * * * *

UNITED STATES PATENT AND TRADEMARK OFFICE
CERTIFICATE OF CORRECTION

PATENT NO. : 6,615,586 B1
APPLICATION NO. : 10/030034
DATED : September 9, 2003
INVENTOR(S) : Boric It is certified that error appears in the above-identified patent and that said Letters Patent is hereby corrected as shown below:

PLEASE DELETE COLUMNS 1 LINE 1 THRU COLUMNS 6 LINE 40 AND INSERT COLUMN 1 LINE 1 THRU COLUMN 6 LINE 40 AS ATTACHED

Signed and Sealed this

First Day of April, 2008

JON W. DUDAS
*Director of the United States Patent and Trademark Office*

HIGH-PRESSURE GAS-TURBINE PLANT USING HIGH-PRESSURE PISTON-TYPE COMPRESSOR

DESCRIPTION OF THE INVENTION

1. Technical Description

The subject matter of the invention belongs to the field of machine engineering (International Patent Classification field F, sub-field: Engines or Motors, class F 02 comprising: combustion motors; hot gas and combustion products powered motor plants).

The invention belongs to the International Patent Classification sub-class F 02 C, comprising gas-turbine plants.

2. Technical Problem

Because of its low degree of efficiency, classical gas turbine has never got widely applied, except with navy and emergency plants where economy is not a priority. The problem is about the gas turbines working with high air flow speeds and relatively low combustion pressures, being therefore no competition to diesel powered engines.

3. Situation in Technology

Gas turbines are subjected to high thermal and mechanical load. They are mostly applied in aeronautics, on navy and to a lesser degree on trains and road vehicles. Due to low efficiency degree, with large plants, heat recuperation systems in steam turbine plant has been introduced.

4. Essence of the Invention

The essence of the invention is about increasing the efficiency of the gas-turbine plant by replacing the turbo-compressor at the high-pressure gas turbine shaft with a high-pressure piston-type air compressor, which enables expansion of the combustion mixture of high adiabatic fall.

Every four-stroke diesel engine can be turned into a high-pressure piston-type air compressor at a low cost and, theoretically, double the air intake for powering the high-pressure gas turbine.

High-pressure gas turbine that, according to this invention, has a piston-type compressor instead of a turbo-compressor on its rotor shaft, is particularly favorable for production of high powers in a single block, and is of:

higher efficiency degree,
high adiabatic fall,
lesser air/combustion-gases flow speeds and, therefore, lesser friction resistance,
lesser rotation speeds,
lesser plant weights,
significantly lesser noise.

5. Figure Description

FIG. 1. shows block-diagram of a high-pressure piston-type gas-turbine plant. The block-diagram in FIG. 1. shows the structure and operating principle of a plant designed for fitting on board of ships.

6. Detailed Description of a Possible Invention Embodiment

As shown in FIG. 1, the high-pressure gas-turbine plant comprises:

high-pressure gas turbine 1 of reinforced sides due to high pressures, thermally and mechanically lesser loaded, supplied on its rotor with a high-pressure piston-type compressor 2, connected directly or indirectly through the gear-box 4, and with as many combustion chambers 18 as there are cylinders in the high-pressure piston-type compressor; each combustion chamber supplied with a fuel valve with combustion stimulators (EPO patent EP593793B1 and HP patent P920497) and one high-pressure pipe 15 connection from every high-pressure compressor 2 cylinder, of better efficiency degree and better useful power; combustion chambers being thermally lesser loaded;

high-pressure piston-type air compressor 2, of high-pressure compression, multi-cylinder, supercharged, single-stage, single-acting, "V", or other compact design, high-speed or medium-speed engine; whereby every four-stroke diesel engine can be turned into a high-pressure piston-type compressor of the following characteristics:

equipped with camshaft powered by crankshaft by means of a gear-box of the rotation speed ratio 1:1;

equipped with intake and output pressure valves in baskets located in the cylinder covers; valve opening and closing being controlled by valve camshaft, like with engines, according to a given cam timing;

equipped with high-pressure fuel pump, cams for operating pump pistons with mechanism for control of intake and of fuel pre-injection angle into the combustion chamber 18 of the high-pressure turbine 1, connected to the control levers;

equipped with control stand 20 from where the entire plant is controlled, equipped with safety equipment and WOODWOORD or other rotation speed regulator, equipped with safety valves located in the cylinder covers, possibly equipped with compressor-starting decompressors;

turbocharger 12, whose low-pressure turbo-compressor takes air from the atmosphere, compresses it to higher pressure, takes it through the air cooler 13 and pressures it to the high-pressure piston-type compressor 2;

low-pressure compression air cooler 13, connected with pipes 14 to the turbocharger 12 and the high-pressure piston-type compressor 2;

high-pressure air pipes 15, connecting each high-pressure piston-type compressor 2 valve with the corresponding combustion chamber 18 at the high-pressure gas-turbine 1 front side;

high-pressure fuel pipes 21, taking fuel from the high-pressure fuel pump, located on the high-pressure compressor 2, to the fuel valves located in the combustion chambers 18 in the high-pressure turbine 1;

connection 16 for ship service air, gear-box 4, consisting of the following gears: gear for taking power from the high-pressure gas turbine 1, gear for taking power from the diesel engine 3, gear for powering the high-pressure piston-type compressor 2, gear for powering the shaft generator 6, and the central propulsion or generator gear 19;

engine 3 for starting of the plant from resting; it can be electric, hydraulic, pneumatic or diesel powered; which engine has generator 17 at one end and the shaft coupling clutch 9 at the other; whereby more powerful engine act as spare propulsion drive in emergency;

power output shaft 5, connected to the central gear 4, and through the trust bearing 11 to the propulsion propeller 19 or the generator;

shaft generator 6, with the kinetic shaft clutch 10 connected to the gear-box 4 at one end, and the electricity frequency stabilising flywheel 22 at the other; whereby in stead of the generator there can be fitted another high-pressure piston-type compressor 2 for doubling the turbine plant power;

shaft coupling clutches 7, 8 and 9, which can be hydraulic, electromagnetic or pneumatic designed, and serve for coupling the high-pressure gas turbine 1, the high-pressure piston-type compressor 2, the engine 3, to and off the gear-box 4;

kinetic shaft clutch 10, which can be pneumatic (patent application HP P921016A) or electromagnetic (patent application HP P931533A);

trust bearing 11 fitted between the gear-box 4 and the shaft 5 and the propulsion propeller 19;

auxiliary generator 17 for generating electricity for the ship and plant requirements;

propulsion propeller 19 with mobile blades.

The high-pressure gas turbine, according to this invention and the block diagram presented in FIG. 1, functions in the following way:

INITIAL STARTING

The plant is initially started from resting by means of the diesel engine 3. The generator 17 is to be switched off the network while the plant is being started. After starting of the diesel engine 3, the shaft coupling clutches 7, 8 and 9 are connected, and the shaft clutch 10 is disconnected. By means of the gear-box 4, the high-pressure gas turbine 1, the high-pressure piston-type compressor 2, the propeller shaft 5 and the propulsion propeller 19 are started simultaneously. Rotation of the high-pressure piston-type compressor 2 pumps air from the atmosphere through the turbocharger 12 turbo-compressor, the air cooler 13 and pipes 14 into the high-pressure compressor 2 where it is being compressed and taken by high-pressure pipes 15 to the high-pressure gas turbine 1 combustion chambers 18, where it expands and drives the high-pressure turbine rotor. After exiting the turbine 1, the air drives the turbocharger 12 gas turbine, that starts low-pressure compression of the atmosphere air in the turbo-compressor. This idle rotation can last a longer period of time.

PERMANENT RUNNING

By moving the fuel handle and the high-pressure fuel pump levers located at the high-pressure compressor 2 into the position RUNNING, high-pressure fuel is driven through the high-pressure fuel pipes 21 into the fuel valves located in the combustion chambers 18 in the high-pressure gas turbine 1.

Combustion gases produced by the fuel combustion expand in the high-pressure gas turbine 1. Here commences transformation of the fuel energy into mechanical work and rotation of the high-pressure gas turbine 1. When leaving the high-pressure gas turbine 1, the combustion gases enter the turbocharger 12 gas turbine, where expansion and driving of the turbocharger turbine is continued. After this, the combustion gases go into economizer and the atmosphere.

Energy of the gases leaving the high-pressure turbine 1 drive the turbocharger 12 which takes air from the atmosphere, compresses it to a higher pressure, drives it through the air cooler 13 and the pipes 14 to the high-pressure piston-type compressor 2 cylinder inlet valves, where the air is compressed to high pressure and, through valves, taken by the pipes 15 into the combustion chambers 18 of the high-pressure gas turbine 1. In the combustion chamber, the fuel is ignited aided by the combustion stimulator that is intended to increase the plant efficiency degree.

After the initial start, the diesel engine 3 is disconnected from the gear box 4, when the generator 17 can be connected to the network.

Permanent running is continued by the high-pressure gas turbine 1, by the produced power and by means of the gear box 4, drives independently the piston-type compressor 2, the shaft 5 with the propeller 19 or the power-plant generator.

Rotation and production of power in the high-pressure gas turbine is modified by changing of charging of the high-pressure fuel pumps located at the high-pressure compressor 2. The entire plant is controlled manually or automatically from the control stand 20. Power and rotation stabilization of the propeller 19 is obtained by known rotation and power regulators such as WOODWOORD or others.

Low-cost electricity can be used while the ship is under way by starting the shaft generator 6 by means of the kinetic shaft clutch 10. The generator 6, at the other end of the rotor shaft, is equipped with the flywheel 22 that stabilizes the produced electricity frequency in conditions of storm, pitching, etc.

The engine 3 and the generator 17 produce electricity when the ship is in port or under way with the shaft coupling clutch 9 disconnected. The engine 3 can be used as an emergency auxiliary propulsion. In such case, the shaft coupling clutches 7, 8 and 10 are disconnected, and the clutch 9 is connected. The generator 17 is switched off the network.

7. Invention Employment

High-pressure gas turbines, equipped with high-pressure piston-type compressor on the rotor shaft will have a wide employment, for their increasing the efficiency degree.

Thanks to their small weight, decreased noise and simplicity, they can be fitted into:

passenger cars, sport cars, all other road-going vehicles, stable and mobile power-supply plants, nautics, for obtaining from the smallest to the highest powers in a single block, on board civil and navy alike, rail traffic, from cargo to super-fast trains, air traffic, in large capacity aeroplanes.

What is claimed is:

1. A gas turbine power plant, comprising:

a gas turbine including a plurality of combustion chambers;

a piston-type air compressor mechanically connected to the gas turbine and driven by it; and a plurality of pipes connected between the air compressor and the combustion chambers, the air compressor supplying compressed air to the combustion chambers of the gas turbine through the pipes.

2. The gas turbine power plant of claim 1, further comprising a fuel pump connected to the compressor and a plurality fuel pipes connected between the fuel pump and the combustion chambers on the gas turbine, the fuel lines supplying fuel from the fuel pump to the combustion chambers.

3. The gas turbine power plant of claim 1, further comprising a turbocharger driven by exhaust gases from the gas turbine and connected to the piston-type compressor such that the turbocharger takes air from the atmosphere, compresses it, and provides the compressed air to the piston-type compressor.

4. The gas turbine power plant of claim 3, further comprising an air cooler disposed between the turbocharger and the piston type compressor such that compressed air from the turbocharger is cooled before entering the piston-type compressor.

5. The gas turbine power plant of claim 1, wherein the piston-type air compressor has a plurality of cylinders, each cylinder having a piston moving therein and an outlet, the number of cylinders equaling the number of combustion chambers, and wherein the plurality of pipes includes a pipe connected between each cylinder outlet and each combustion chamber.

6. The gas turbine power plant of claim 5, wherein the piston-type air compressor is made from a diesel engine modified to operate as an air compressor.

7. The gas turbine power plant of claim 1, wherein the piston-type air compressor is mechanically connected to the gas turbine through a gearbox.

8. The gas turbine power plant of claim 7, wherein the gas turbine and the compressor are each connected to the gearbox through a selectively engageable and disengageable shaft-coupling clutch.

9. The gas turbine power plant of claim 7, further comprising a generator 6 connected to the gearbox through a kinetic clutch at one end, and having an electricity frequency stabilizing flywheel at its other end.

10. The gas turbine power plant of claim 7, further comprising a second piston type compressor connected to the gearbox, the second piston type compressor also supplying compressed air to the gas turbine to further increase power produced by the gas turbine.

11. The gas turbine power plant of claim 7, further comprising an output shaft connected to the gearbox such that the output shaft is driven by the gas generator.

12. The gas turbine power plant of claim 11, wherein the output shaft drives a propeller for a marine vessel.

13. The gas turbine power plant of claim 7, further comprising an engine for starting the gas turbine power plant, the engine being connected to the gearbox through a selectively engageable and disengageable shaft-coupling clutch.

14. The gas turbine power plant of claim 13, wherein the engine for starting is a diesel engine.

15. The gas turbine power plant of claim 14, further comprising an auxiliary generator connected to the diesel engine.

16. A gas turbine power plant, comprising:

a gas turbine including a plurality of combustion chambers;

a piston-type air compressor mechanically connected to the gas turbine and driven by it through a gearbox, the gas turbine and compressor each connected to the gearbox through a selectively engageable and disengageable shaft-coupling clutch;

an output shaft connected to the gearbox such that the output shaft is driven by the gas generator;

an engine for starting the gas turbine power plant, the engine being connected to the gearbox through a selectively engageable and disengageable shaft-coupling clutch; and a plurality of pipes connected between the air compressor and the combustion chambers, the air compressor supplying compressed air to the combustion chambers of the gas turbine through the pipes.

17. In a gas turbine power plant having a source of compressed air and a source of fuel, the compressed air and fuel being combined in a plurality of combustion chambers and combusting therein to produce combustion gases that drive a gas turbine, the improvement comprising: using a piston-type air compressor as the source of compressed air rather than a turbo-compressor, the piston-type air compressor being mechanically connected to the gas turbine and driven by it.

* * * * *